United States Patent
Kawazoe et al.

(10) Patent No.: US 9,992,309 B2
(45) Date of Patent: Jun. 5, 2018

(54) COMMUNICATION DEVICE AND COMMUNICATION METHOD

(71) Applicant: KABUSHIKI KAISHA TOSHIBA, Minato-ku, Tokyo (JP)

(72) Inventors: Hiroshi Kawazoe, Kawasaki (JP); Shunichi Gondo, Tokyo (JP); Hiroyuki Aizu, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 387 days.

(21) Appl. No.: 14/085,154

(22) Filed: Nov. 20, 2013

(65) Prior Publication Data

US 2014/0143315 A1    May 22, 2014

(30) Foreign Application Priority Data

Nov. 20, 2012    (JP) .................................. 2012-254588

(51) Int. Cl.
*G06F 15/16* (2006.01)
*H04L 29/06* (2006.01)
*H04L 29/08* (2006.01)

(52) U.S. Cl.
CPC .............. *H04L 69/16* (2013.01); *H04L 67/02* (2013.01); *H04L 67/06* (2013.01); *H04L 67/145* (2013.01)

(58) Field of Classification Search
CPC ......... H04L 69/16; H04L 67/00; H04L 67/02; H04L 67/06; H04L 67/145
See application file for complete search history.

(56) References Cited

U.S. PATENT DOCUMENTS

| 8,667,183 | B1 * | 3/2014 | L'Heureux | ............. H04L 67/02 709/203 |
| 2002/0107966 | A1 * | 8/2002 | Baudot | ................... H04L 69/40 709/227 |
| 2007/0198684 | A1 | 8/2007 | Mizushima | |
| 2008/0114882 | A1 * | 5/2008 | Christenson | .......... H04L 69/162 709/228 |
| 2008/0307037 | A1 * | 12/2008 | Zhang | ..................... H04L 67/14 709/203 |

(Continued)

FOREIGN PATENT DOCUMENTS

| JP | 3-237542 H | 10/1991 |
| JP | 2000-057095 A | 2/2000 |

(Continued)

OTHER PUBLICATIONS

Japanese Notification of Reasons for Refusal dated Sep. 14, 2016 from corresponding Japanese Patent Application No. 2012-254588, 8 pages.

(Continued)

*Primary Examiner* — Yves Dalencourt
(74) *Attorney, Agent, or Firm* — Ohlandt, Greeley, Ruggiero & Perle, L.L.P.

(57) ABSTRACT

In general, according to one embodiment, a communication device conducts connection type data communications. The device includes an application configured to supply or request data by using a connection. The device also includes a termination unit that receives a request of terminating the data communications, and reports, to the application, termination of the connection without terminating the connection.

8 Claims, 9 Drawing Sheets

(56) References Cited

U.S. PATENT DOCUMENTS

| | | | |
|---|---|---|---|
| 2008/0307093 A1* | 12/2008 | Song | H04L 12/12 709/226 |
| 2010/0064130 A1* | 3/2010 | Borisov | H04L 67/142 713/151 |
| 2010/0241696 A1 | 9/2010 | Matoba | |
| 2012/0218914 A1* | 8/2012 | Tanaka | H04L 1/1874 370/253 |
| 2013/0083680 A1 | 4/2013 | Kawazoe et al. | |

FOREIGN PATENT DOCUMENTS

| | | |
|---|---|---|
| JP | 2005-011267 A | 1/2005 |
| JP | 2007-226398 A | 9/2007 |
| JP | 2008-134767 A | 6/2008 |
| JP | 2010-219845 A | 9/2010 |
| JP | 2011-233979 A | 11/2011 |
| WO | 01/76175 A2 | 10/2001 |

OTHER PUBLICATIONS

Japanese Notice of Allowance dated Mar. 14, 2017 from corresponding Japanese Patent Application No. 2012-254588, 6 pages.

\* cited by examiner

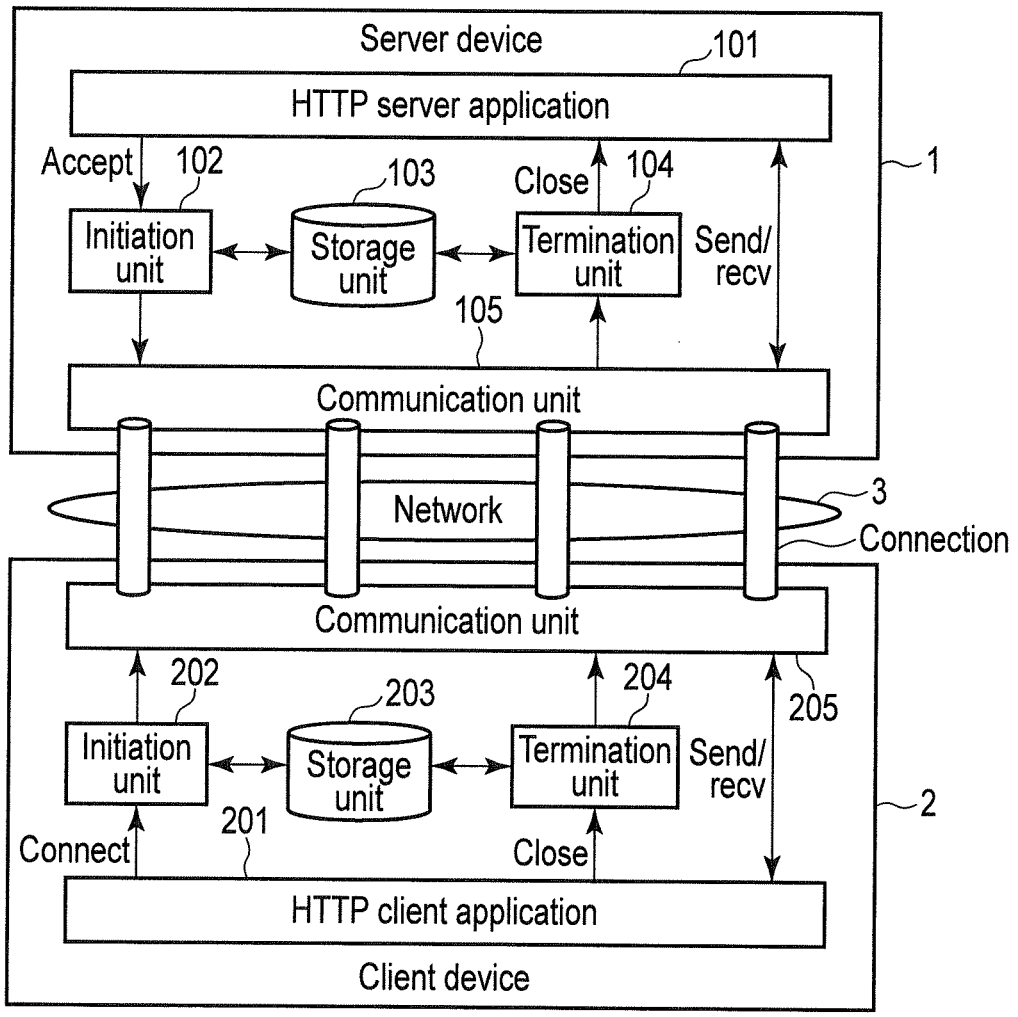
F I G. 1

Header

Data Type
• HTTP···0x00
• Initiation unit···0x01
• Termination unit···0x02 duration=10
http://example.com/video-1.m2ts
duration=10
http://example.com/video-2.m2ts
duration=10
http://example.com/video-3.m2ts
...
F I G. 4
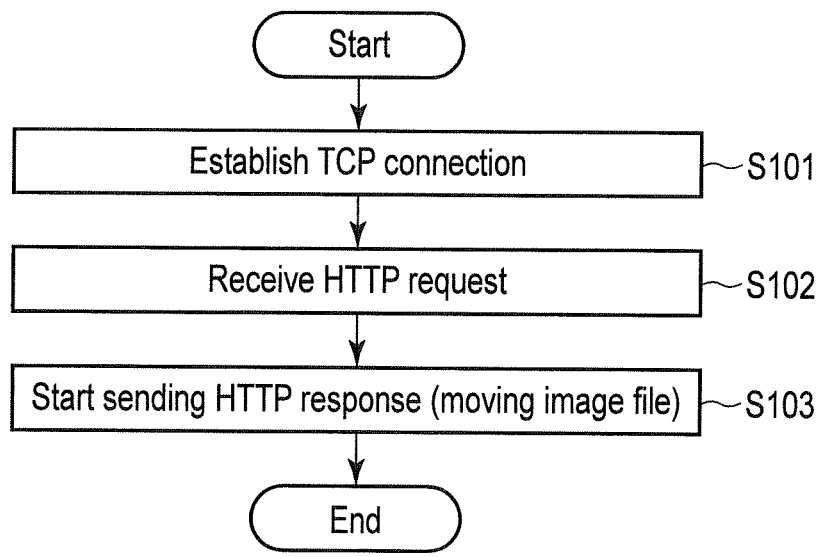
F I G. 5

| Identifier | IP address | Port number | Standby time |
|---|---|---|---|
| 10 | 192.168.0.1 | 80 | 200000 |
| | | | |
| | | | |

| Identifier | IP address | Port number | Standby time |
|---|---|---|---|
| 20 | 192.168.0.2 | 80 | 200000 |
| | | | |
| | | | |

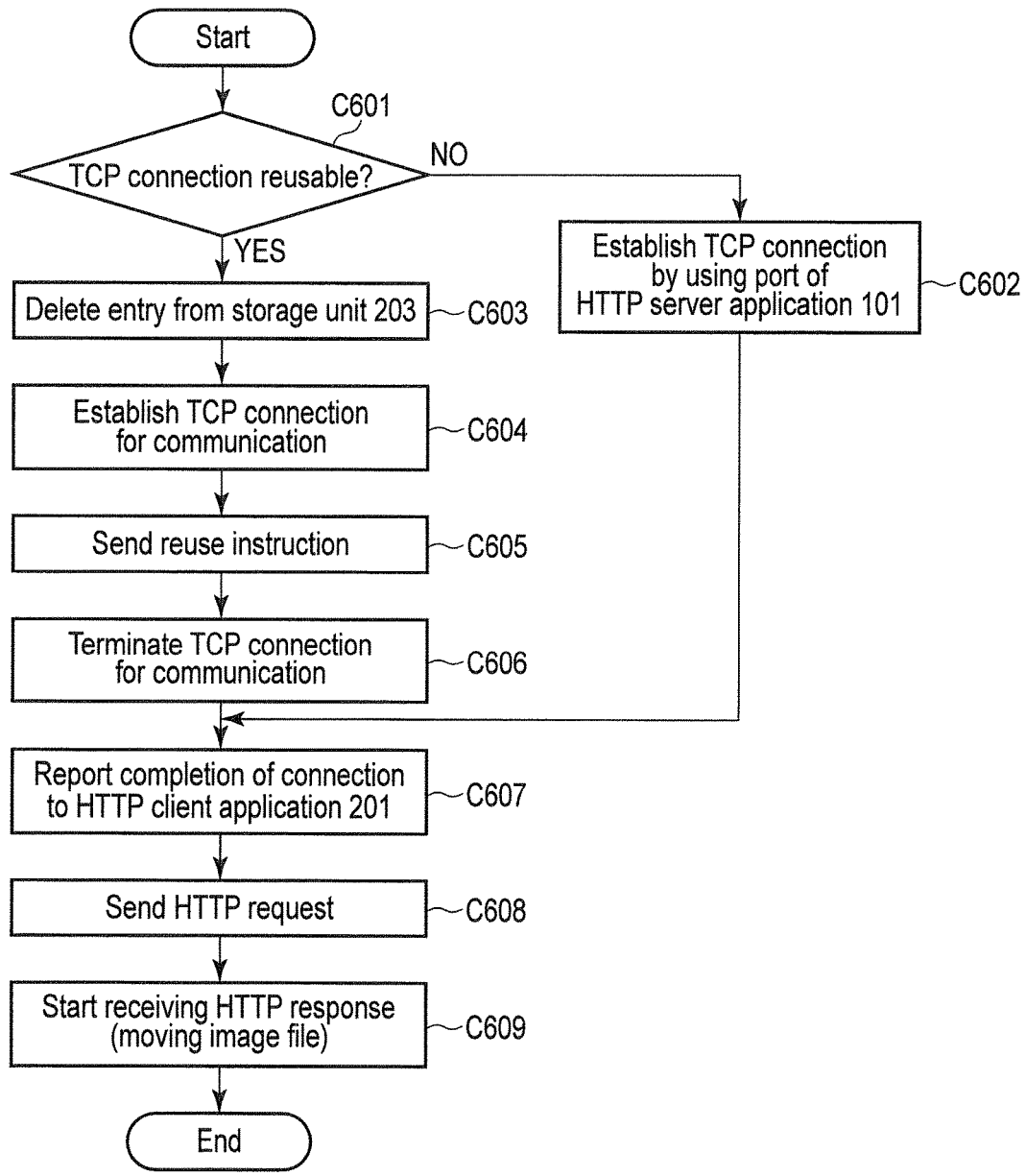
F I G. 12

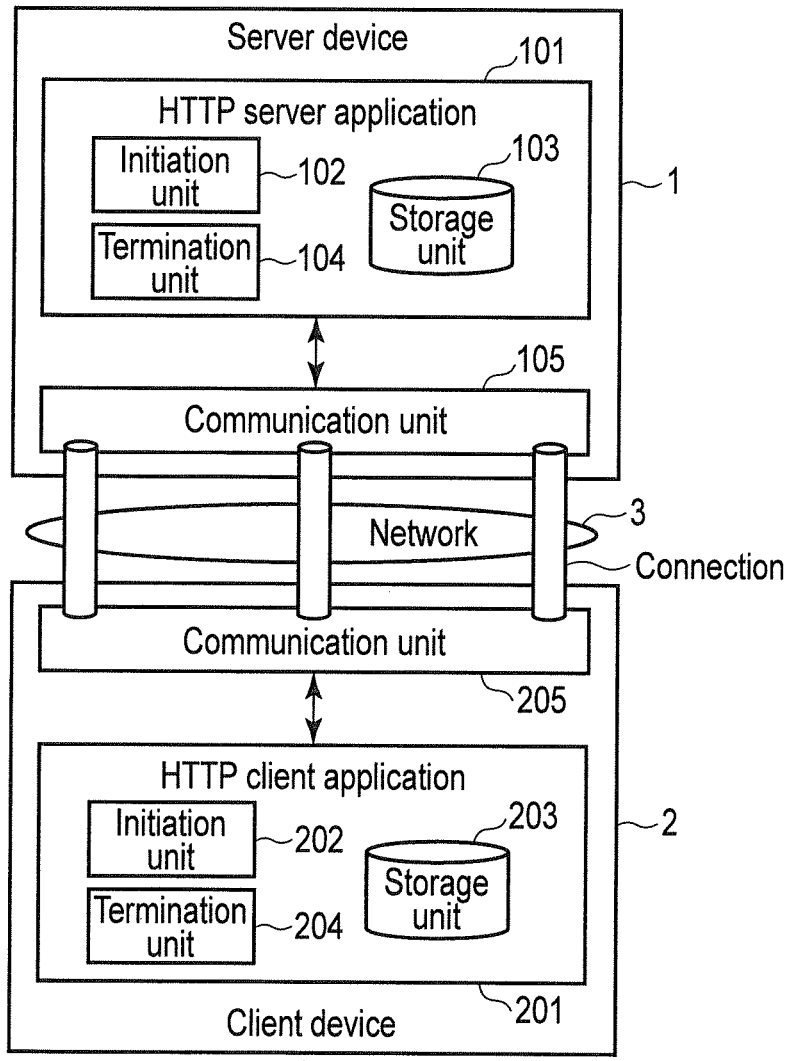
F I G. 13

COMMUNICATION DEVICE AND COMMUNICATION METHOD

CROSS-REFERENCE TO RELATED APPLICATIONS

This application is based upon and claims the benefit of priority from Japanese Patent Application No.2012-254588, filed Nov. 20, 2012, the entire contents of which are incorporated herein by reference.

FIELD

Embodiments described herein relate generally to a communication device and a communication method.

BACKGROUND

In an information communication system that sends/receives data between a server device and a client device which are connected through a network, the server device and the client device send/receive information by using, for example, a connection type transmission scheme.

A representative example of such a connection type transmission scheme is TCP/IP. When TCP/IP is utilized, a sender and a receiver establish a TCP connection therebetween. Then, the sender adds a TCP header, including a sequence number and a window size, to data; separates the data into packets; and sends these packets to the receiver. In response, the receiver sends the sender an acknowledgement (ACK), which indicates the reception of the data. Through the above processing, the data transfer is achieved, in which data reliably arrives in proper order. Moreover, TCP is equipped with a congestion control mechanism that controls a rate of data to be sent to a network, in order to prevent the congestion of the network.

In TCP, a sender internally uses a parameter called a "congestion window", in order to control the congestion of a network. This congestion window refers to the maximum number of packets which the sender is allowed to sequentially send the receiver without the acknowledgement from the receiver. Immediately after the TCP connection is established, the sender sets the congestion window to a small value as an initial one, thereby decreasing the amount of data to be sent. Subsequently, every time the sender receives the acknowledgement, it increases the congestion window, thereby increasing the amount of data to be sent, so that the bandwidth of the network is used efficiently. This operation is known as a slow start.

BRIEF DESCRIPTION OF THE DRAWINGS

FIG. 1 is a diagram illustrating a configuration of a video distribution system according to a first embodiment;

FIG. 4 illustrates an example of a playlist of a moving image file;

FIG. 5 is a flowchart of a process performed by the server device when a TCP connection is initialized (first time);

FIG. 12 is a flowchart of a process performed by the client device when the TCP connection is initiated (second time);

FIG. 13 is a diagram illustrating a configuration of a video distribution system according to a second embodiment.

DETAILED DESCRIPTION

Figure 2:
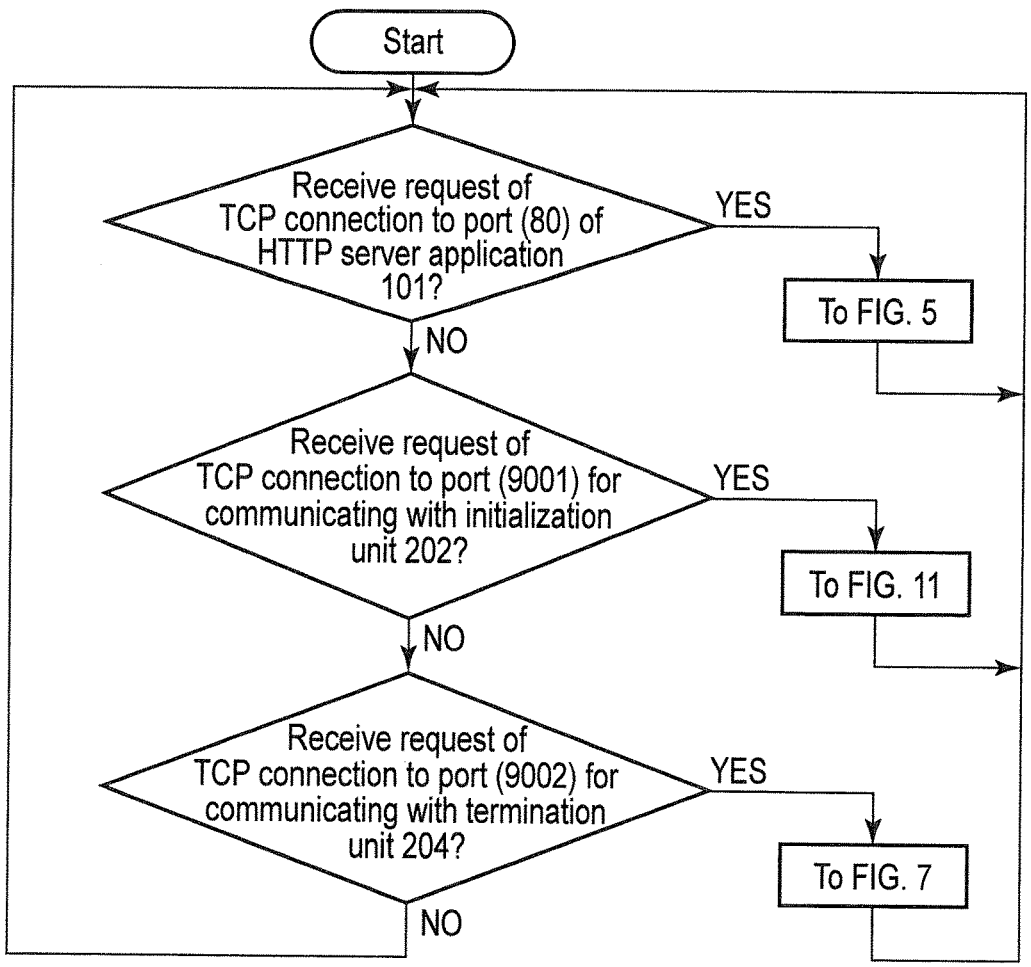
FIG. 2 is a flowchart of an activation and connection standby operation of a server device.

In general, according to one embodiment, a communication device conducts connection type data communications. The device includes an application configured to supply or request data by using a connection. The device also includes a termination unit that receives a request of terminating the data communications, and reports, to the application, termination of the connection without terminating the connection.

Hereinafter, embodiments will be described with reference to the accompanying drawings.

(First Embodiment)

FIG. 1 illustrates a configuration of a video distribution system according to the first embodiment. In this video distribution system, two information processing terminals (or a server device 1 and a client device 2) that function as an HTTP server and an HTTP client, respectively, are connected to each other through a network 3. The server device 1 is configured to provide video adaptive streaming by using chunks.

(Configuration of Server Device)

The server device 1 includes an HTTP server application 101, an initiation unit 102, a storage unit 103, a termination unit 104, and a communication unit 105.

The HTTP server application 101 receives an HTTP request from the client device 2, and sends a requested moving image file (chunks) to the client device 2 as an HTTP response.

The initiation unit 102 stands by for a TCP connection request from the client device 2, in response to a connection standby request from the HTTP server application 101. In addition, when the initiation unit 102 receives an instruction of reusing a TCP connection, if there is any reusable TCP connection, it reports an identifier of the reusable TCP connection to the HTTP server application 101.

The storage unit 103 stores information regarding a TCP connection that stands by for reuse.

The termination unit 104 stands by for a request of terminating a TCP connection from the client device 2. When receiving an instruction of standing by for reuse of an in-use TCP connection from the client device 2, the termination unit 104 reports an identifier of this in-use TCP connection to the HTTP server application 101.

The communication unit 105 initiates and terminates a TCP connection to the client device 2. In addition, the communication unit 105 reports an HTTP request from the client device 2 to the HTTP server application 101, and sends a responded HTTP response to the client device 2. When receiving an instruction of reusing a TCP connection from the client device 2, the communication unit 105 reports the reception of this instruction to the initiation unit 102.

Likewise, when receiving an instruction of standing by for reusing a TCP connection from the client device 2, the communication unit 105 reports the reception of this instruction to the termination unit 104.

(Configuration of Client Device)

The client device 2 includes an HTTP client application 201, an initiation unit 202, a storage unit 203, a termination unit 204, and a communication unit 205.

The HTTP client application 201 requests a moving image file (chunks) from the server device 1 by sending an HTTP request thereto, and reproduces the chunks received as an HTTP response.

The initiation unit 202 sends a TCP connection request to the server device 1, in response to a connection request from the HTTP client application 201. In addition, when any TCP connection to the server device 1 can be reused, the initiation unit 202 sends an instruction of reusing this connection to the server device 1.

The storage unit 203 stores information regarding a TCP connection that stands by for reuse.

The termination unit 204 sends the server device 1 an instruction of standing by for reuse of an in-use TCP connection without terminating this TCP connection, in response to a request of terminating the TCP connection from the HTTP client application 201. If the TCP connection is not reused or cannot be reused, the termination unit 204 sends the termination of the TCP connection to the server device 1.

The communication unit 205 initiates or terminates a TCP connection to the server device 1. In addition, the communication unit 205 reports, to the server device 1, an instruction of reusing a TCP connection which is received from the initiation unit 202. Likewise, the communication unit 205 reports, to the server device 1, an instruction of standing by for reuse of a TCP connection which is received from the termination unit 204.

(Process Flow)

Next, a description will be given of a flow of a process performed by the information communication system according to this embodiment, by referring to the accompanying drawings as appropriate.

[Activation and Connection Standby Operation of Server]

FIG. 2 is a flowchart of an activation and connection standby operation of the server device 1.

In the server device 1, first, the HTTP server application 101 is activated. Then, the HTTP server application 101 loads the initiation unit 102, the storage unit 103, the termination unit 104, and the communication unit 105. After the activation, the HTTP server application 101 outputs a connection standby request to the initiation unit 102. In this embodiment, the initiation unit 102 provides the HTTP server application 101 with an application programming interface (API) that is compatible with a function of accept, which is APT for standing by for a connection in a standard socket library. In the following description, a function for standing by for a connection in the standard socket library is referred to as an "accept", and the compatible API that the initiation unit 102 provides is referred to as "accept_new", for the sake of the distinction. In addition, the API in the standard socket library is provided by the communication unit 105. The HTTP server application 101 calls the function of accept_new to give the initiation unit 102 an instruction of standing by for a connection. An argument for calling accept_new designates a port number (for example, 80) that the HTTP server application 101 uses.

The initiation unit 102 outputs a request of standing by for a connection to the communication unit 105 through accept_new, and stands by for the reception of a report. In response, the communication unit 105 calls the function of accept in a socket library, and stands by for the reception of a TCP connection request (SYN) from the client device 2. In this case, the communication unit 105 uses the port number that has received through "accept_new", as an argument for calling accept. In parallel with the above processing, the communication unit 105 also calls the function of accept by using a port number (for example, 9001) for communicating with the initiation unit 202 of the client device 2, and a port number (for example, 9002) for communicating with the termination unit 204. Then, the communication unit 105 stands by for a TCP connection request. Specifically, the communication unit 105 keeps standing by for a TCP connection request, until the TCP connection request is delivered to any of the port number (80) for an application, the port number (9001) for communicating with the initiation unit 202, and the port number (9002) for communicating with the termination unit 204.

Figure 3:
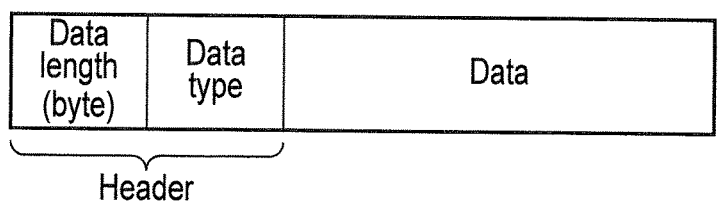
FIG. 3 is a view illustrating an example of a header according to a data type.

In this embodiment, the communications between the initiation units 102 and 202 and between the termination units 104 and 204 are conducted by utilizing TCP with a dedicated port number; however this limitation is not essential. Alternatively, any given transmission protocol, such as UDP, may be utilized. In addition, the communications between the initiation units 102 and 202 and between the termination units 104 and 204 may be conducted in a multiplexing manner through a TCP connection used between the HTTP server application 101 and the HTTP client application 201. In this case, data used in HTTP, data used by the initiation units 102 and 202, and data used by the termination units 104 and 204 are mixed in a single stream. Accordingly, each of the communication units 105 and 205 needs to add a header to data in accordance with a data type. FIG. 3 illustrates an example of a header added to data. In this example, information indicating a data length and a data type is added to data as a header.

[Activation and Connection Request Operation of Client]

In the client device 2, the HTTP client application 201 is activated. Then, the HTTP client application 201 loads the initiation unit 202, the storage unit 203, the termination unit 204, and the communication unit 205. The HTTP client application 201 may be, for example, a moving image player. The HTTP client application 201 retains a playlist of a moving image file, as described in FIG. 4, in advance. In this playlist, respective pairs of reproduction time and URL of files, each of which is a separated chunk of 10 seconds, are listed. After the activation, the HTTP client application 201 sequentially acquires and reproduces the files in the playlist from the top, for example, in response to a user's operation of reproduction start or the like.

The HTTP client application 201 outputs a connection request to the initiation unit 202, in order to start data communications. In this embodiment, the initiation unit 202 provides API that is compatible with a function of connect, which is API for a connect request in the standard socket library. In the following description, the function for a connection request in the standard socket library is referred to as "connect", and the compatible API that the initiation unit 202 provides is referred to as "connect_new", for the sake of the distinction. In addition, the API in the standard socket library is provided by the communication unit 205. The HTTP client application 201 calls the function of connect_new to give the initiation unit 202 an instruction of a connection request. An argument for calling connect_new designates the IP address of the server device 1, and the port number (80) of the HTTP client application 201.

The initiation unit 202 determines whether or not an entry, the pair of IP address and port number of which matches that received as the argument through connect_new, is present in the storage unit 203. Because no entry is present in the storage unit 203 immediately after the activation of the HTTP client application 201, the determination result becomes "NO." If the result becomes "YES", a process to be performed will be described later. If the result is "NO", the initiation unit 202 gives the communication unit 205 an instruction of a connection request, and stands by for the reception of a report. In response, the communication unit 205 calls the function of connect in the socket library, and sends a TCP connection request (SYN) to the server device 1. In this case, the communication unit 205 uses the IP address of the server device 1 and the port number (80) of the HTTP client application 201 that have received through connect_new, as an argument for calling connect.

[Initiation of TCP connection (First Time)]

Figure 6:
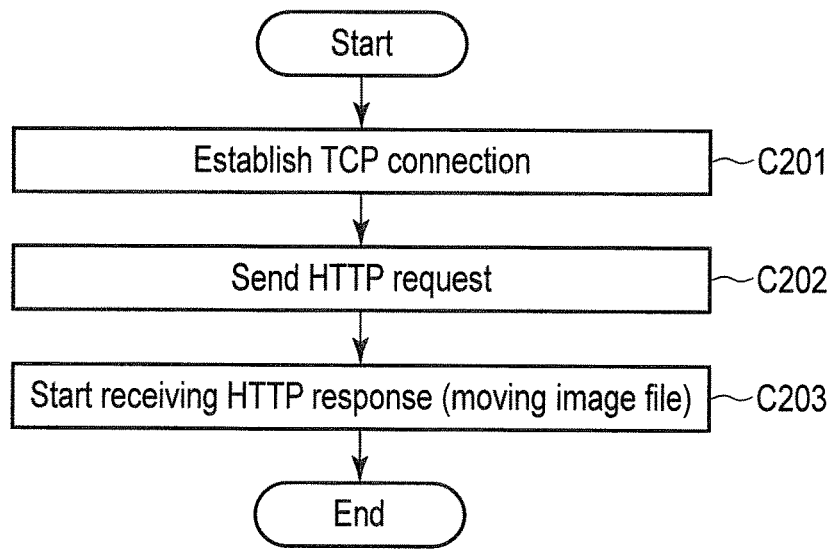
FIG. 6 is a flowchart of a process performed by a client device when the TCP connection is initiated (first time)

FIGS. 5 and 6 are flowcharts of processes performed by the server device 1 and the client device 2, respectively, when the TCP connection is initiated (first time).

When receiving a request (SYN) of a TCP connection to the port number (80) of the HTTP server application 101, the communication unit 105 of the server device 1 sends SYN and ACK to the communication unit 205 of the client device 2. In addition, the communication unit 205 sends ACK to the communication unit 105. Through this processing, a three-way handshake has completed. Consequently, a TCP connection is established between the communication units 105 and 205 (S101).

After the TCP connection is completely established, the communication unit 105 reports the completion of the connection establishment to the initiation unit 102. In response, the initiation unit 102 reports the completion of the connection establishment to the HTTP server application 101. In this case, an identifier, such as a socket descriptor, of the established TCP connection is passed to the HTTP server application 101. Then, the HTTP server application 101 calls the function of recv, which is API for receiving data that is provided by the communication unit 105. The identifier of the TCP connection which the HTTP server application 101 has already received is used as an argument for calling recv. After that, the HTTP server application 101 stands by for the arrival of an HTTP request from the client device 2 (S102). In addition, the HTTP server application 101 re-sends a standby request to the initiation unit 102. The subsequent process flow is identical to that has been described above.

In this embodiment, an identifier of the TCP connection is passed to the HTTP server application 101, in response to the report of the completion of connect_new; however this limitation is not essential. Alternatively, the present embodiment is applicable to API specifications in which the communication unit 105 provides the HTTP server application 101 with a function of socket as API for creating a socket; and the HTTP server application 101 calls this function to acquire the identifier of the TCP connection, and passes this identifier to the initiation unit 102 as an argument for calling connect_new.

Meanwhile, in the client device 2, when the TCP connection is completely established (C201), the communication unit 205 reports the completion of the connection establishment to the initiation unit 202. In response, the initiation unit 202 reports the completion of the connection establishment to the HTTP client application 201. In this case, the identifier of the established TCP connection is passed to the HTTP client application 201. Then, the HTTP client application 201 calls the function of send, which is API for sending data provided by the communication unit 205. The HTTP client application 201 creates an HTTP request containing a URL of a file to be acquired, and uses it together with the received identifier of the TCP connection, as an argument for calling send. This HTTP request is sent to the server device 1 through the created TCP connection (C202), and is passed to the HTTP server application 101.

When receiving the HTTP request, the HTTP server application 101 sends a retained moving image file to the client device 2 as an HTTP response (S103). The moving image file is sent by using the function of send. After that, the HTTP client application 201 repeatedly calls the function of recv, thereby receiving the moving image file (C203).

[Termination (Reuse Standby) of TCP Connection]

Figure 7:
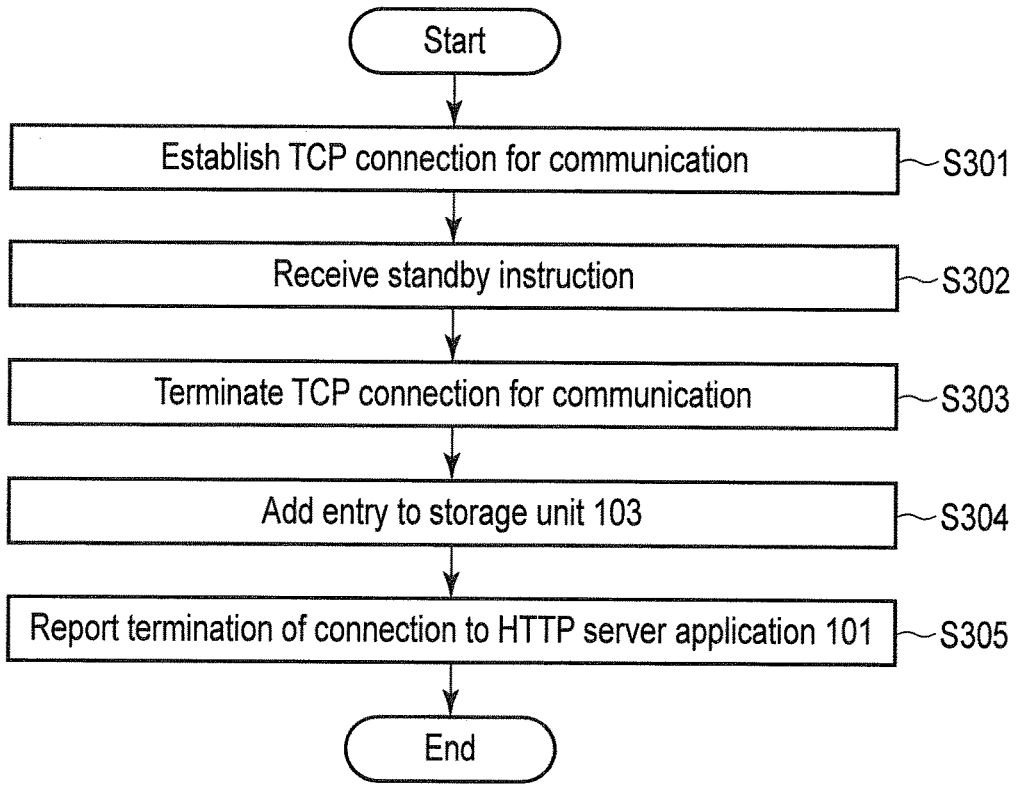
FIG. 7 is a flowchart of a process performed by the server device when the TCP connection is terminated (or when the server stands by for reuse)
Figures 8, 9, 10:
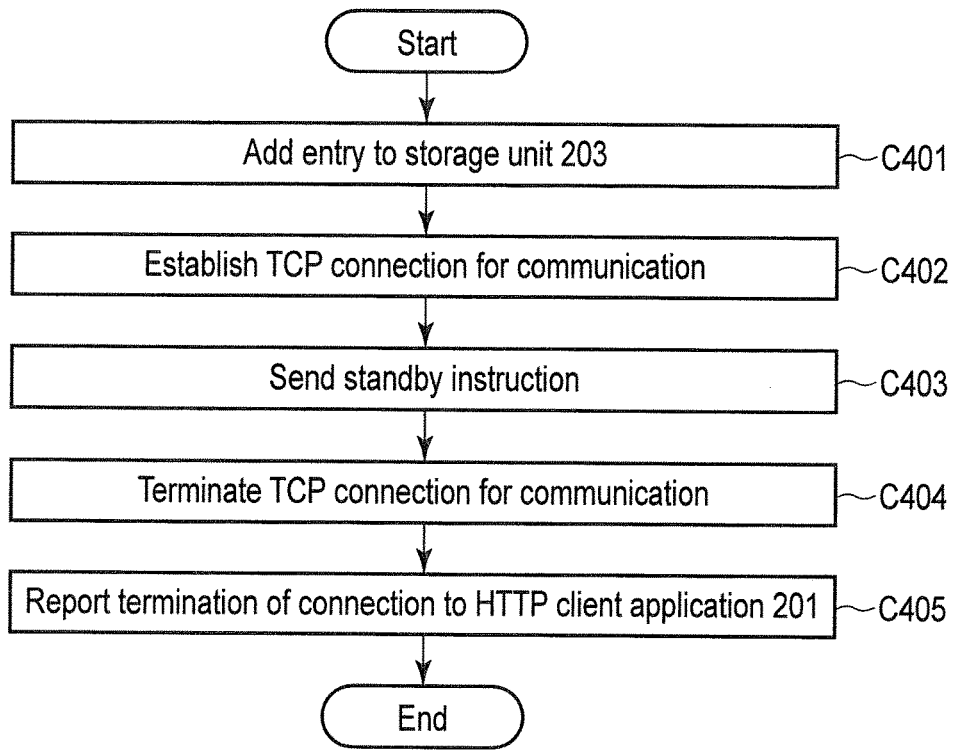
FIG. 8 is a flowchart of a process performed by the client device when the TCP connection is terminated (or when the client device stands by for reuse)
FIG. 9 illustrates an example of information stored in a storage unit of the client device.
FIG. 10 illustrates an example of information stored in a storage unit of the server device.

FIGS. 7 and 8 are flowcharts of processes performed by the server device 1 and the client device 2, respectively, when the TCP connection is terminated (or stands by for reuse).

Once the HTTP request is sent to the server device 1, the HTTP client application 201 of the client device 2 starts receiving the moving image file (chunks). When completely receiving the moving image file, the client device 2 starts reproducing a moving image, and simultaneously acquires chunks for a subsequent time. However, if the bandwidth of the network is not wide enough, there are cases where the reception of the moving image file is not completed timely. In such a case, one solution is that the client device 2 delays the timing of reproducing the moving image until completely receiving the chunks. However, this solution may keep a user waiting for a long time, or every time the client device 2 receives the second or subsequent chunks, the moving image may stop being reproduced. As a result, the above solution deteriorates the viewability of the user. Accordingly, when the client device 2 cannot completely receive the moving image file by a prescribed reproduction time, it aborts the reception of the moving image file at this moment, and switches to acquire the chunks at a lower bit rate. Here, the prescribed reproduction time is set to a time after a predetermined period (10 seconds) since the moving image starts being received. When a preset time (5 seconds) passes, the client device 2 estimates the bandwidth, based on the elapsed time period and the size of the received data. Then, the client device 2 determines whether to be able to completely receive the remaining data by the prescribed reproduction time, on the assumption that the estimated bandwidth continues as it is. If determining that the reception cannot be completed, the client device 2 cancels the received data, and switches to acquire the chunks at a lower bit rate.

The specifications of HTTP do not support a function of cancelling data in the course of the transmission. Therefore, in order to terminate the transmission of the data, the client device 2 operates to terminate the TCP connection. The HTTP client application 201 outputs a termination request to the termination unit 204. In this embodiment, the termination unit 204 provides API that is compatible with the function of close, which is API for terminating a connection in the standard socket library. In the following description, a function for terminating a connection in the standard socket library is referred to as "close", and the compatible API that the termination unit 204 provides is referred to as "close_new", for the sake of the distinction. The HTTP client application 201 calls the function of close_new to give the termination unit 204 an instruction of terminating the connection. The identifier of the TCP connection used to receive the moving image file is passed to the HTTP client application 201 as an argument for calling close_new.

Next, the termination unit 204 stores, in the storage unit 203, information regarding the identifier of the TCP connection, the IP address of the server device 1, and the port number, all of which have been received through close_new (C401 in FIG. 8). FIG. 9 illustrates an example of information stored in the storage unit 203. FIG. 9 describes the above information, and a time upon storage of the information (or an elapsed time (milliseconds) since the client device 2 is activated). In parallel with this operation, the termination unit 204 calls the function of connect by using the port number (9002) for communicating with the termination unit 104 of the server device 1, thereby sending a TCP connection request to the termination unit 104. When a TCP connection for the communication with the termination unit 104 is completely established by using this port number (S301 and C402), the termination unit 204 sends a standby instruction to the termination unit 104 (C403). Here, the term "standby instruction" refers to an instruction of standing by for reuse of a non-terminated TCP connection by using a process that will be described later. Once receiving this standby instruction (S302), the termination unit 104 terminates the TCP connection for the communication (S303), and stores, in the storage unit 103, information regarding the identifier of the TCP connection, the IP address of the client device 2, and the port number, all of which have been passed (S304).

FIG. 10 illustrates an example of information stored in the storage unit 103. FIG. 10 describes the above information, and a time upon storage of the information (or an elapsed time (milliseconds) since the server device 1 is activated). The termination unit 104 reports the termination of the connection to the HTTP server application 101 (S305). In fact, however, this TCP connection is present without being terminated.

The HTTP server application 101 terminates the sending of data, in response to the report of the termination of the connection.

In this embodiment, the termination unit 104 may employ any given method of reporting the termination of the connection to the HTTP server application 101. For example, the termination unit 104 may employ a method of calling the function of callback designated by the HTTP server application 101, or a method of sending back a specified error code, in response to API, such as send or recv, which the HTTP server application 101 calls.

Once completely sending the standby instruction, the termination unit 204 terminates the TCP connection for the communication (C404). When above processing is completed, the termination unit 204 reports the complete termination of the connection to the HTTP client application 201 (C405). In fact, however, the TCP connection is present without being terminated.

[Initiation of TCP Connection (Second Time)]

Figure 11:
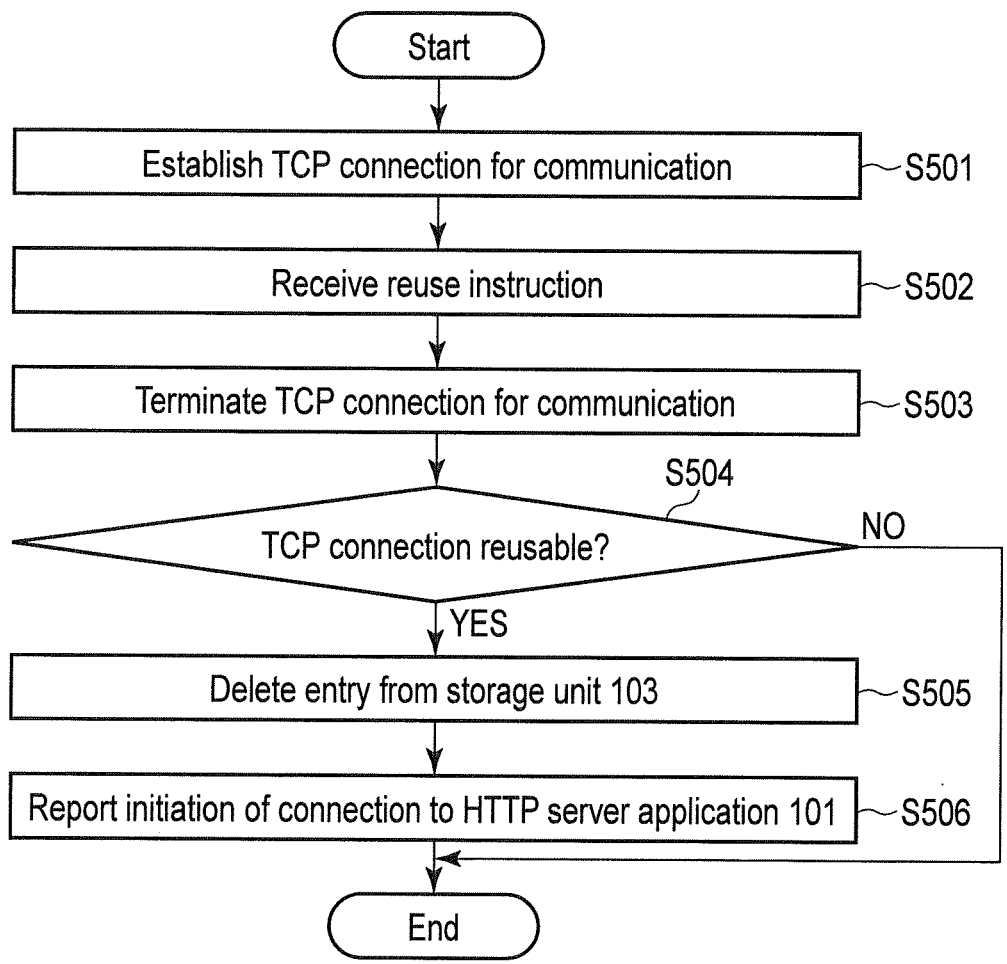
FIG. 11 is a flowchart of a process performed by the server device when a TCP connection is initiated (second time)

FIGS. 11 and 12 are flowcharts of processes performed by the server device 1 and the client device 2, respectively, when the TCP connection is initiated (second time).

When finishing calling the function of close_new, the HTTP client application 201 calls close_new again, in order to acquire subsequent chunks. Then, the HTTP client application 201 outputs a connection request to the initiation unit 202, thereby starting data communications. An argument used to call the function of connect_new is identical to that used in the first time.

The initiation unit 202 determines whether or not an entry, the pair of IP address and port number of which matches that received as the argument through connect_new, is present in the storage unit 203. Since the corresponding entry is present in this case, as illustrated in FIG. 9, the determination result becomes "YES." Note that the description has already been given, regarding the case where the result becomes "NO." If the result is "YES", the initiation unit 202 recognizes that the TCP connection corresponding to the above IP address is still present without being terminated, and therefore is reusable (C601). Otherwise, if the result is "NO", the initiation unit 202 establishes a TCP connection by using a port of the HTTP server application 101 (C602). This operation does not correspond to that of reusing the TCP connection.

If the TCP connection is reusable, the initiation unit 202 deletes the above entry from the storage unit 203 (C603). Moreover, the initiation unit 202 calls the function of connect by using the port number (9001) for communicating with the initiation unit 102 of the server device 1, thereby requesting a TCP connection from the initiation unit 102. The TCP connection for the communication is completely established by using the port number (S501 and C604), and then the initiation unit 202 sends a reuse instruction to the initiation unit 102 (C605). This reuse instruction contains the port number (80) and the IP address (or the IP address of the client device 2) received upon calling of connect_new. When receiving the reuse instruction (S502), the initiation unit 102 terminates the TCP connection for the communication (S503). Then, the initiation unit 102 determines whether or not the pair of IP address and port number that is contained in the reuse instruction is present in the storage unit 103. In other words, the initiation unit 102 determines whether the TCP connection is reusable or not (S504). Since the corresponding entry is present in this case, as illustrated in FIG. 10, the determination result becomes "YES." If the result is "YES", the initiation unit 102 deletes the above entry from the storage unit 103 (S505), and reports the connection initiation to the HTTP server application 101 (S506). In this case, the identifier of the TCP connection which is described in the entry is passed to the HTTP server application 101.

After completing the sending of the reuse instruction, the initiation unit 202 terminates the TCP connection for the communication (C606). When having completed the above processing, the initiation unit 202 reports the completion of the connection request to the HTTP client application 201 (C607). In this case, the initiation unit 202 also reports an identifier of a TCP stream stored in the storage unit 203. The subsequent processing is identical to that for the first time. In more detail, the HTTP client application 201 sends an HTTP request to the HTTP server application 101 through the reused TCP connection (C608), and starts receiving a moving image file as an HTTP response (C609).

According to the first embodiment as described above, while the same server device and the same client device repeat TCP are communicating with each other, once one of the applications gives an instruction of terminating the TCP connection to the other, both devices maintain a TCP connection therebetween to render it be in a standby state, and report the complete termination of the TCP connection to the respective applications. Followed by, when receiving an instruction of re-initiating a TCP connection from the one application, the other application reuses the TCP connection that is in the standing state, and reports the complete initiation of the TCP connection to the respective applications of the server and client devices. The above operation lightens a load involved in the processing of initiating or terminating the TCP connection, and reduces the delay of the initiation or termination thereof, thereby making it possible to improve the efficiency of utilizing the bandwidth of the network. The first embodiment produces a prominent effect, especially, in an application, such as that in which a network has a considerable delay or connections are initiated and terminated frequency.

In the first embodiment, each of the initiation unit 102, the termination unit 104, the initiation unit 202, and the termination unit 204 provides the API that is compatible with the standard socket library. With this compatibility, the above effect of the first embodiment is produced without modifying the existing HTTP server application 101 and HTTP client application 201. In this case, the server device 1 may employ a configuration in which the components excluding the HTTP server application 101 (the initiation unit 102, the storage unit 103, the termination unit 104, and the communication unit 105) are constituted as a library that is compatible with the standard socket library, and this library is used in place of the standard socket library that the HTTP server application 101 loads. Likewise, the client device 2 may also employ a configuration in which the components excluding the HTTP client application 201 (the initiation unit 202, the storage unit 203, the termination unit 204, and the communication unit 205) are constituted as a library that is compatible with the standard socket library. Needless to say, the above configurations are not essential. Moreover, interfaces that are defined in any given form may be used between the HTTP server application 101 and the initiation unit 102, between the HTTP server application 101 and the termination unit 104, between the HTTP client application 201 and the initiation unit 202, and between the HTTP client application 201 and the termination unit 204.

In the first embodiment, there is no upper limit of the number of TCP connections in a standby state between the server device 1 and the client device 2; however an upper limit may be imposed thereon. In this case, for example, it is assumed that an upper limit is imposed on the number of entries stored in each of the storage unit 103 and the storage unit 203. In addition, the addition of a new entry is requested for the storage units 103 and 203, and the number of entries stored therein exceeds the upper limit if they accept the request. In this example, one of the entries stored in each of the storage units 103 and 203 which has the oldest standby time may be deleted, so that the number of entries is kept within the upper limit. In this case, the TCP connection corresponding to the deleted entry is terminated by exchanging FIN/ACK between the termination units 104 and 204. Alternatively, an entry may be deleted, in which an elapsed time since it is added to the storage unit 203 exceeds a prescribed threshold. In this case, each of the termination units 104 and 204 checks a difference between a current time and a standby time of an entry stored in each of the storage units 103 and 203, at regular intervals. Then, if the difference exceeds the prescribed threshold, the termination units 104 and 204 delete this entry and terminate the corresponding TCP connection, similar to the above. By terminating an old TCP connection automatically in the above matter, each of the server device 1 and the client device 2 can reduce the number of resources consumed therein. Furthermore, if a plurality of entries with the same IP address are present in the storage units 103 and 203, the termination units 104 and 204 may perform an additional process of deleting these entries preferentially. This makes it possible to provide an equitable service.

(Second Embodiment)

The second embodiment provides a similar configuration to that of the first embodiment. Specifically, two information processing terminals (server device 1 and client device 2) that functions as an HTTP server and an HTTP client, respectively, are connected to each other through a network 3.

In the server device 1, an HTTP server application 101 provides a web page. In the client device 2, an HTTP client application 201 is an application such as a browser. FIG. 13 illustrates the configuration of the second embodiment.

Figure 14:
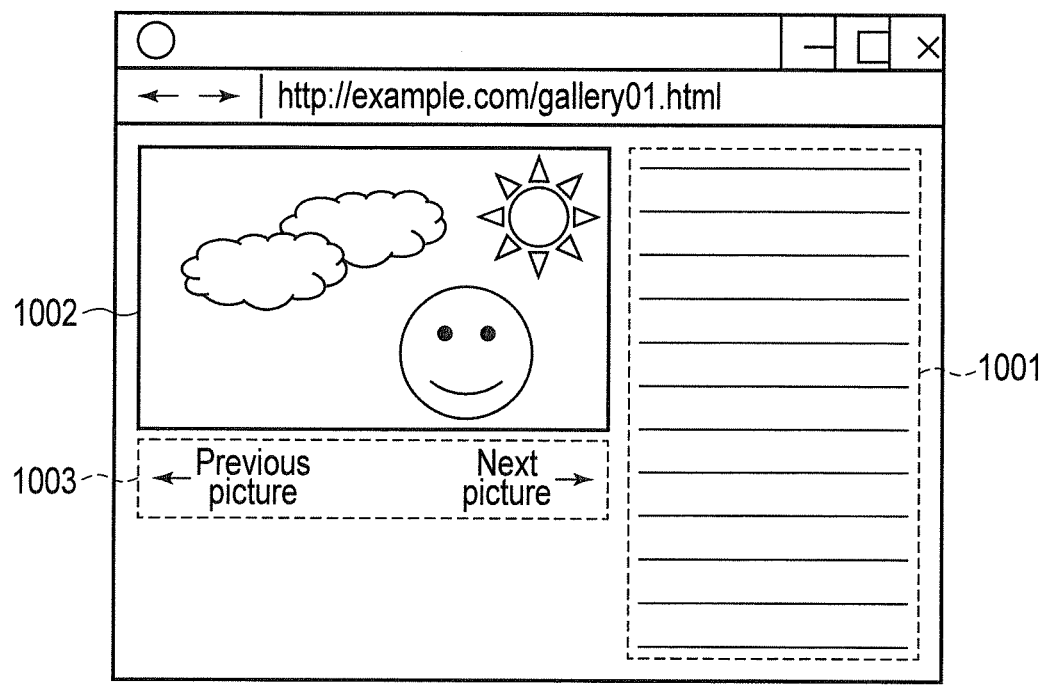
FIG. 14 is a view illustrating an example of information displayed with HTTP.

The web page that the HTTP server application 101 provides is described with HTML. In this HTML file, the reading of an image file is designated with an img tag. The HTTP client application 201 downloads the HTML file by using a first HTTP request, and acquires the image file described in the downloaded HTML file by using a second HTTP request. As a result, the HTTP client application 201 displays information on both acquired files. FIG. 14 illustrates an example of the display of the information. This information includes a text 1001, an image 1002, and a link 1003. A user can give an instruction of displaying another file to the client device 2 by clicking a character string of the link 1003. In this case, in response to the user's click operation, the HTTP client application 201 creates a new HTTP request, and downloads an HTML file in a similar manner to that described above.

If the bandwidth of the network is not wide enough, there are cases where it takes a long time to download data with a large size, such as the image 1002. In such a case, there are various display methods that the HTTP client application 201 of the client device 2 can employ. For example, the HTTP client application 201 may display the image 1002 after completely downloading entire data thereof, or may display the image 1002 in stages from the top thereof, along with the progress of the download. Alternatively, the HTTP client application 201 may initially display the image 1002 vaguely, and may gradually clarify it along with the progress of the download.

Even when the HTTP client application 201 employs any of the above display methods, there are cases where the user clicks the link 1003 in the course of the download of the image 1002. In order to provide the user with a designated page timely, the HTTP client application 201 of the client device 2 needs to create a new HTTP request and send it to the server device 1, at the time of the user's click. In this case, the image 1002 that is being downloaded is no longer necessary. Accordingly, the HTTP client application 201 needs to abort the download of the old data, in order to prevent the consumption of the bandwidth, which is caused by the download of the old data, from affecting the download of the new data.

Thereinafter, processing performed by the server device 1 and the client device 2 will be given, regarding a case where a user clicks a link while the client device 2 is acquiring a web page containing an image as described in FIG. 14, and the client device 2 transits to acquire another web page (provided by the same server) in response to the click.

(Acquisition of HTML and Image Files)

The HTTP client application 201 (browser application) of the client device 2 acquires an HTML file from the HTTP server application 101 of the server device 1, in response to a user's operation such as an input of an URL. Here, it is assumed that the HTTP client application 201 acquires an HTML file "gallery.html" from a site named "example.com." First, the HTTP client application 201 sends the initiation unit 202 a request of acquiring a TCP connection which is required to send an HTTP request. The initiation unit 202 has therein a storage area (storage unit 203) for storing a site of a file that has been most recently acquired and an identifier of a TCP connection used to acquire this file. Since there is no acquired file in the first time, both of the site name and the identifier are initialized with "null".

The initiation unit 202 determines whether or not the site of the file to be acquired this time matches that stored in the storage area. In this case, the determination result becomes "NO" (null≠example.com). Then, the initiation unit 202 requests the communication unit 205 to create a TCP connection to this site. The communication unit 205 performs a TCP three-way handshake with the communication unit 105 of the server device 1, thereby creating a TCP connection. Then, the communication unit 205 sends an identifier of this TCP connection to the initiation unit 202. This identifier is passed to the HTTP client application 201. The HTTP client application 201 creates an HTTP request for requesting an HTML file "gallery01.html" through the TCP connection, and requests the communication unit 205 to send it. This HTTP request is sent to the HTTP server application 101 through the initiation unit 102. In response, the HTTP server application 101 sends the HTML file retained therein to the HTTP client application 201 as an HTTP response.

The HTTP client application 201 analyzes the received HTML file, and recognizes that the image 1002 (image.jpg) and the link 1003 (gallery01.html) are embedded in a page of the HTML file. Then, the HTTP client application 201 creates an HTTP request for requesting the image 1002, and sends it to the HTTP server application 101 through the communication unit 205. At the same time, the HTTP client application 201 subjects the page of the HTML file to rendering, and displays this page. As a result, the page with the blank image 1002 is provided to the user. The HTTP server application 101 sends the image file "image.jpg" as an HTTP response, in response to the HTTP request for the image 1002. Note that when the HTTP client application 201 acquires the image 1002, an HTTP persistent connection is available, and the TCP connection is not terminated while the gallery01.html and the image.jpg are being acquired.

(Abort of Acquiring Image File)

It is assumed that the link 1003 is clicked by a user's operation in the course of receiving the image 1002, and a transition to another page "gallery02.html" occurs. In this case, the HTTP client application 201 determines to abort the reception of the image 1002, and gives an abort instruction to the termination unit 204. The termination unit 204 reports the abort instruction to the termination unit 104 of the server device 1 through the communication unit 205. Here, there is no limitation on a method of reporting the abort instruction. For example, a method of creating a TCP connection by using a port number for the report, a method using UDP, or any other arbitrary method may be employed. When receiving the abort instruction, the HTTP server application 101 aborts the sending of the image 1002.

After outputting the abort instruction, the HTTP client application 201 updates the information regarding the site name of the most recently acquired file retained therein and the identifier of the TCP connection used to acquire this file. The information on the site name of the file acquired most recently is updated to "example.com", and the information on the identifier of the TCP connection is updated to that used to acquire the image 1002.

Next, the HTTP client application 201 attempts to acquire a page to be transited (gallery02.html). The HTTP client application 201 requests the initiation unit 202 to acquire a TCP connection required to send an HTTP request, similar to the first acquisition. The initiation unit 202 determines whether or not a site of a file to be acquired this time matches that stored in the storage area. In this case, the determination result becomes "YES" (both sites are "example.com").

Then, the initiation unit 202 passes, to the HTTP client application 201, the identifier of the TCP connection which is stored in the storage unit 203.

The HTTP client application 201 creates an HTTP request for requesting an HTML file "gallery02.html" by using the TCP connection, and requests the communication unit 205 to send it. This HTTP request is sent to the HTTP server application 101 through the initiation unit 102. In response, the HTTP server application 101 sends the HTML file retained therein to the HTTP client application 201 as an HTTP response.

The second embodiment, as described above, produces the same effect as the first embodiment does.

In the first and second embodiments, the type of data to be transmitted is video or an image; however there is no limitation on the type of data to be transmitted, and any given type of data may be used. Furthermore, the server device 1 and the client device 2 utilize HTTP as an application; however there is no limitation on the application, and any given application may be used. With the first and second embodiments, the cancel function can be provided to an application, particularly such as HTTP, which does not support a function of cancelling data being sent without terminating the TCP connection.

In the first and second embodiments, the data communications are initiated and terminated on the client side; however there is no limitation on a side on which the data communications are initiated and terminated. In TCP data communications, typically, the server and the client are not identified, once the TCP connection is completely established. For this reason, the first and second embodiments are also applicable to a case where the data communications are initiated and terminated on the server side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device that conducts connection type data communications, comprising:
   circuitry configured to
      supply or request data in an application by using a connection between the communication device and a second device;
      receive a request of terminating the data communications;
      report, to the application, termination of the connection without terminating the connection,
      wherein the connection is repeated by the communication device and the second device that are communicating with each other to reduce a load involved in initiating or terminating the connection;
   a storage to store an identifier of the second device in the data communications and an identifier of the connection in relation with each other,
   wherein the storage further stores a time at which the identifier of the connection is stored;
   a communication unit that terminates connections for stored times that are oldest among a plurality of connections that have not been terminated in response to the request of terminating the data communications; and an initiation unit that receives a request of initiating the data communications, determines whether or not a reusable connection is present in the storage in response to the request, and reports, to the application, an identifier of a connection determined to be reusable, wherein the initiation unit sends a report signal that notifies the second device in the data communications to standby for reuse of the connection.

2. The device according to claim 1, wherein the application conducts data communications through HTTP.

3. The device according to claim 1, wherein the circuitry is further configured to provide an application programming interface (API) that is compatible with an API for the data communications which the application uses.

4. The device according to claim 1, wherein the initiation unit provides an application programming interface (API) that is compatible with an API for the data communications which the application uses.

5. The device according to claim 1, wherein the circuitry reports complete termination of the connection to the application and another application of the second device in the data communications.

6. A communication device that conducts connection type data communications, comprising:

circuitry configured to:

supply or request data in an application by using a connection between the communication device and a second device;

receive a request of terminating the data communications;

report, to the application, termination of the connection without terminating the connection, wherein the connection is repeated by the communication device and the second device that are communicating with each other to reduce a load involved in initiating or terminating the connection;

a storage to store an identifier of the second device in the data communications and an identifier of the connection in relation with each other;

an initiation unit that receives a request of initiating the data communications, determines whether or not a reusable connection is present in the storage in response to the request, and reports, to the application, an identifier of a connection determined to be reusable; and a communication unit that terminates one or more connections whose stored times exceed a prescribed time period, among a plurality of connections which have not been terminated against the request of terminating the data communications, wherein the storage further stores a time at which the identifier of the connection is stored.

7. A communication method of conducting connection type data communications, comprising:

supplying or requesting data in an application by using a connection between a communication device and a second device;

receiving a request of terminating the data communications by circuitry; and reporting termination of the connection to the application, without terminating the connection, wherein the connection is repeated by the communication device and the second device that are communicating with each other to reduce a load involved in initiating or terminating the connection;

storing in a storage an identifier of the second device in the data communications and an identifier of the connection in relation with each other;

further storing in the storage a time at which the identifier of the connection is stored:

terminating connections for stored times that are oldest among a plurality of connections that have not been terminated against the request of terminating the data communications;

receiving a request of initiating the data communications, determining whether or not a reusable connection is present in the storage in response to the request, and reporting, to the application, an identifier of a connection determined to be reusable; and sending a report signal that notifies the second device in the data communications to standby for reuse of the connection.

8. A non-transitory computer-readable medium storing a program that allows a computer to conduct connection type data communications, the program configured to perform a procedure comprising:

supplying or requesting data in an application by using a connection between a communication device and a second device;

receiving a request of terminating the data communications; and reporting termination of the connection to the application, without terminating the connection, wherein the connection is repeated by the communication device and the second device that are communicating with each other to reduce a load involved in initiating or terminating the connection;

storing in a storage an identifier of the second device in the data communications and an identifier of the connection in relation with each other;

further storing in the storage a time at which the identifier of the connection is stored:

terminating connections for stored times that are oldest among a plurality of connections that have not been terminated against the request of terminating the data communications;

receiving a request of initiating the data communications, determining whether or not a reusable connection is present in the storage in response to the request, and reporting, to the application, an identifier of a connection determined to be reusable; and sending a report signal that notifies the second device in the data communications to standby for reuse of the connection.

* * * * *